(No Model.)
A. F. NORRIS.
PIANO PEDAL.
No. 585,004. Patented June 22, 1897.
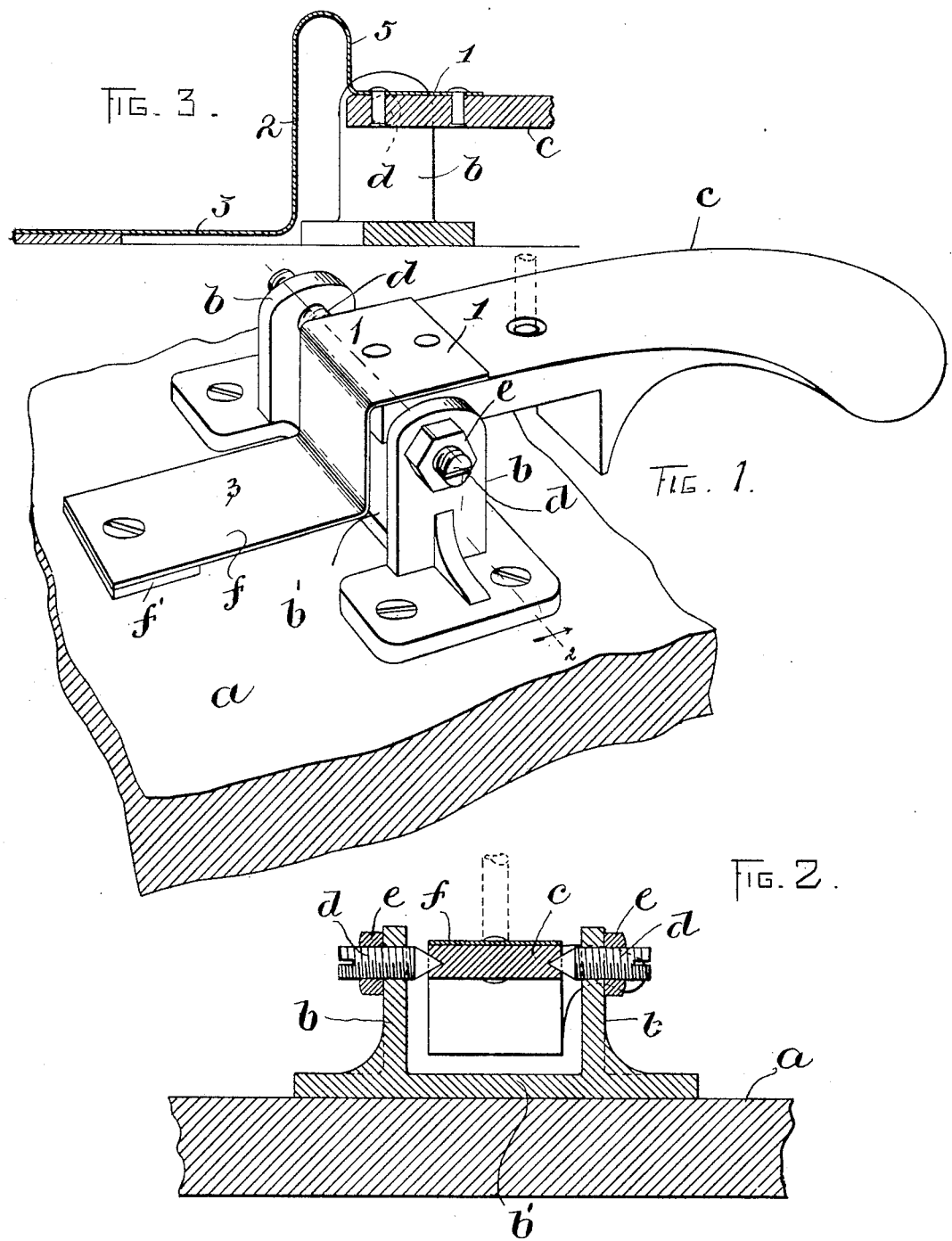
WITNESSES:
A. D. Hanson
P. W. Pizzetta
INVENTOR:
Albert F. Norris

UNITED STATES PATENT OFFICE.

ALBERT F. NORRIS, OF BOSTON, MASSACHUSETTS.

PIANO-PEDAL.

SPECIFICATION forming part of Letters Patent No. 585,004, dated June 22, 1897.

Application filed February 6, 1897. Serial No. 622,328. (No model.)

*To all whom it may concern:*

Be it known that I, ALBERT F. NORRIS, of Boston, in the county of Suffolk and State of Massachusetts, have invented certain new and useful Improvements in Piano-Pedals, of which the following is a specification.

This invention has for its object to provide improved means for mounting and supporting pedals of pianofortes and other instruments; and it consists in the improvements which I shall now proceed to describe and claim.

Of the accompanying drawings, forming part of this specification, Figure 1 is a rear perspective view of a piano-pedal embodying my invention. Fig. 2 is a section on the line 2 2 of Fig. 1, looking in the direction of the arrow. Fig. 3 represents a sectional view of a modification.

The same letters and numerals of reference indicate the same parts in all the figures.

In the drawings, $a$ represents the part of a piano-frame which supports the pedal $c$.

$b\ b$ represent upright standards between which the pedal-lever $c$ is fulcrumed. The said standards are preferably formed on a base $b'$, which is screwed to the support $a$, said base and standards constituting a bracket.

The standards $b\ b$ are provided near their upper portions with two pivots $d\ d$, which are preferably screws having pointed or conical ends which fit into corresponding recesses formed in opposite edges of the pedal near its inner end. The said pivots, which screw into and through the standards $b\ b$, are preferably provided with lock-nuts $e\ e$, bearing on the standards, as shown in the drawings.

$f$ represents a sheet-metal spring having one end riveted or otherwise firmly secured to the inner extremity of the pedal $c$ and having its other end secured to the support $a$. The spring is composed of a strip of suitably-tempered sheet-steel or other suitable metal, having an end portion 1, attached to the pedal by screws or rivets, and an end portion 3, attached to the support $a$, the strip being bent between said portions to form a connecting portion 2, arranged to suitably offset the portion 3 from the portion 1. The portions 2 and 3 constitute a substantially L-shaped spring the operative part of which is located between the screws or rivets that attach the end portions of the spring to the pedal and support. The said L-shaped spring is arranged to permit a free oscillation of the pedal on the pivots $d\ d$ and holds the pedal normally in its raised position, the spring yielding to permit the depression of the treadle.

It will be seen that the rigid attachment of the ends of the spring to the pedal and support enables it to act without rubbing contact with the pedal or with any other part, while the pivots $d\ d$, rigidly supported by the standards $b\ b$, securely confine the pedal in the plane in which it is intended to oscillate and permit the employment of a spring which is rigidly attached to the pedal and support, enabling said spring to readily control the pedal. The pivots present comparatively frictionless bearings which are free from liability to creak when the pedal is worked.

It is desirable to introduce a thin block or strip $f'$ between the lower end of the spring $f$ and the support $a$, so as to raise the lower portion of the said spring from its support and thus give the spring greater freedom of movement.

It will be seen from the foregoing description that my improved pedal is noiseless in its operation, it being provided with antifriction-pivots and with a particularly simple and noiseless spring. The bracket pivotally connected with the pedal and composed of a single casting or part adapted for attachment to the support $a$ and the spring riveted to the pedal and also adapted to be attached to the support enable the pedal to be installed and made operative by the act of screwing the bracket and spring to the support $a$.

I do not limit myself to the particular form of spring here shown and may variously modify the same without departing from the spirit of my invention, the essential features of which are a spring connecting the pedal of a piano with a fixed support, the spring being attached positively to the framework and support and the pedal working on antifriction-pivots.

In Fig. 3 I show a modified form of spring in which there is an upwardly-projecting neck 5 between the part 1, which is attached to the pedal, and the downwardly-projecting part 2.

This form gives greater elasticity than that shown in Fig. 1 and is preferable where only a light pressure is required.

I claim—

1. The combination of a pedal, a bracket adapted for attachment to a support and having pivots engaged with the pedal, and an offset-spring attached at one end to the rear end of the pedal and having a portion thereof extended downwardly behind said rear end of the pedal, the free end of said spring being adapted for attachment to said support.

2. The combination with the bracket, comprising the two standards $b$ $b$ and the integral base-plate $b'$, of the pedal pivotally connected with said standards, and the L-shaped spring having one end connected to the pedal adjacent to the pivotal point thereof and having the other end adapted to be attached to a suitable support, the intermediate portion of the spring being extended downward behind the rear end of the pedal, substantially as described.

In testimony whereof I have signed my name to this specification, in the presence of two subscribing witnesses, this 4th day of February, A. D. 1897.

ALBERT F. NORRIS.

Witnesses:
  HORACE BROWN,
  A. D. HARRISON.